Aug. 15, 1933.　　　G. A. MITCHELL　　　1,922,742
CINEMATOGRAPHIC APPARATUS
Filed June 16, 1931　　　2 Sheets-Sheet 1

INVENTOR
GEORGE A. MITCHELL
by Roberts, Cushman & Woodberry
ATTYS

Aug. 15, 1933. G. A. MITCHELL 1,922,742
CINEMATOGRAPHIC APPARATUS
Filed June 16, 1931 2 Sheets-Sheet 2
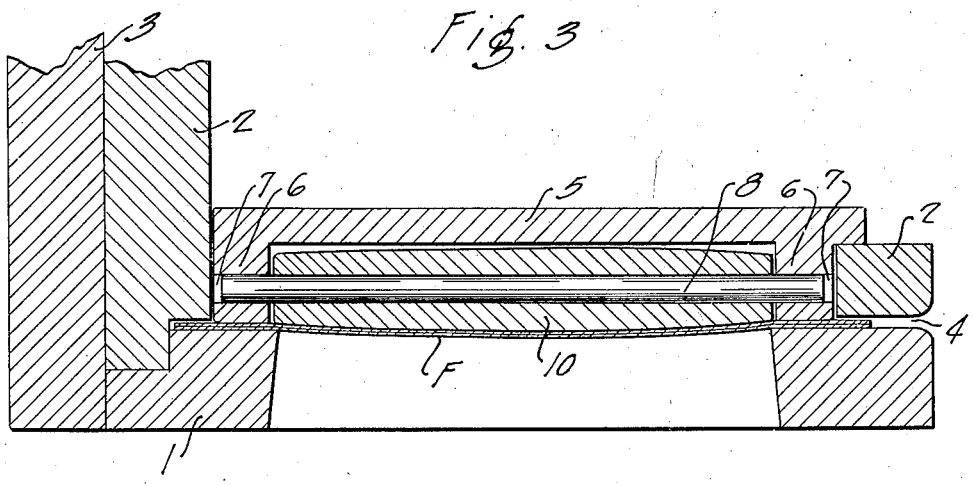
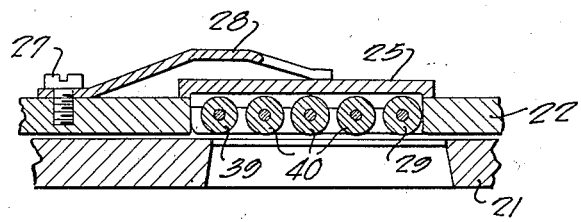
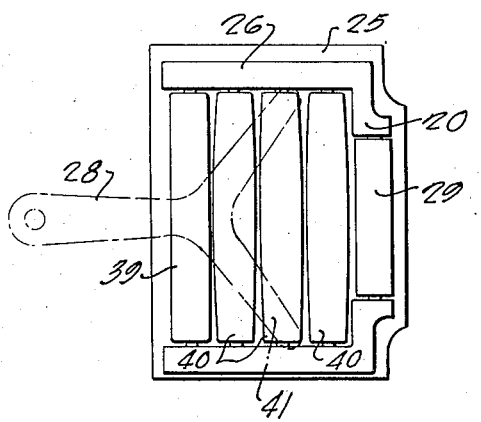
INVENTOR
GEORGE A. MITCHELL
by Roberts, Cushman & Woodbury
ATT'YS Patented Aug. 15, 1933

1,922,742

UNITED STATES PATENT OFFICE 1,922,742

CINEMATOGRAPHIC APPARATUS

George A. Mitchell, Palms, Calif., assignor to Mitchell Camera Corporation, West Hollywood, Calif., a Corporation of Delaware Application June 16, 1931. Serial No. 544,788

3 Claims. (Cl. 88—17)

Cinematographic camera movements ordinarily comprise devices for feeding a film strip through the aperture of a motion picture camera and also arrangements for securing coincidence of the recording surface or emulsion of the film with the focal plane of the photographic lens system. In certain cases, where two or more films are employed in one aperture, as proposed for example in the patent of Joseph A. Ball, No. 1,889,030, granted November 29, 1932, it becomes necessary to establish perfect contact of the superposed films with their emulsions face to face in order definitely to position both emulsions in the focal plane. It is the main object of the present invention to provide a device for establishing uniform close contact between successive portions of superposed films as they are fed past the aperture of a motion picture machine. Another object is to impart to a film moving past the aperture of a motion picture machine a dished configuration which is sufficient to establish a predetermined shape of the film surface at the aperture but which is not so pronounced as to impair the sharpness of the image projected on this surface. Additional objects and advantages will become apparent hereinafter.

According to the present invention, I secure close contact of the superposed films by very slightly bending them so that they are forced into close contact. However, since the bending must be so slight as not to remove any portion of the recording surface substantially from the focal plane, I propose to warp the films, that is, bend them very little in two dimensions instead of to a larger degree in only one dimension. I accomplish this by employing slightly crowned film guiding means behind the central portion of the film aperture, while the marginal parts of the picture area are positioned substantially in a plane.

For the purpose of illustrating the genus of the invention, a concrete embodiment thereof will be described in two modifications by way of example, with reference to the accompanying drawings in which:

Fig. 3 is a cross section on line 3—3 of Fig. 2;

Fig. 4 is a section corresponding to Fig. 1, showing a modification of the invention; and Fig. 5 is a bottom view, corresponding to Fig. 2, of the modification.

Figure 1:
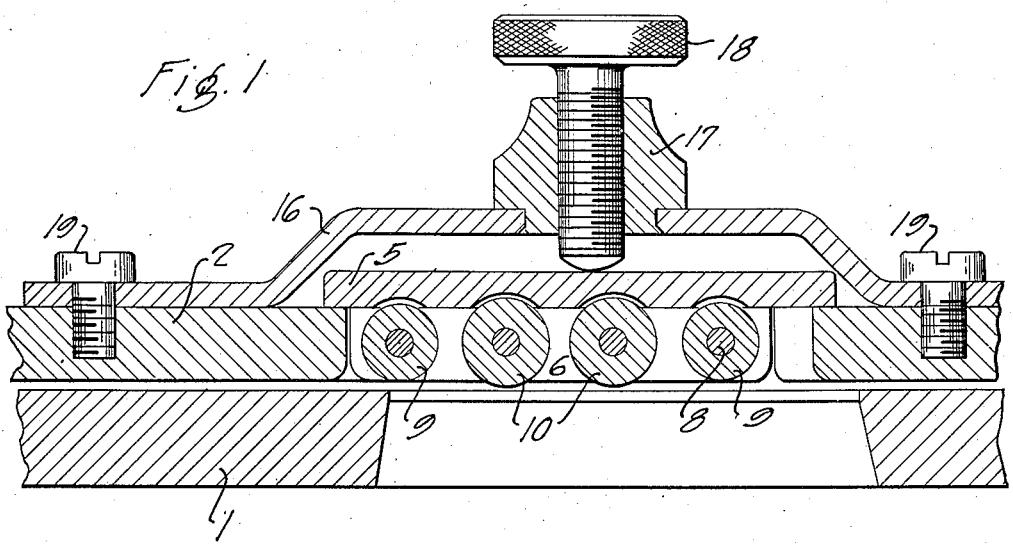
Fig. 1 is a cross section of a film aperture, on line 1—1 of Fig. 2.
Figure 2:
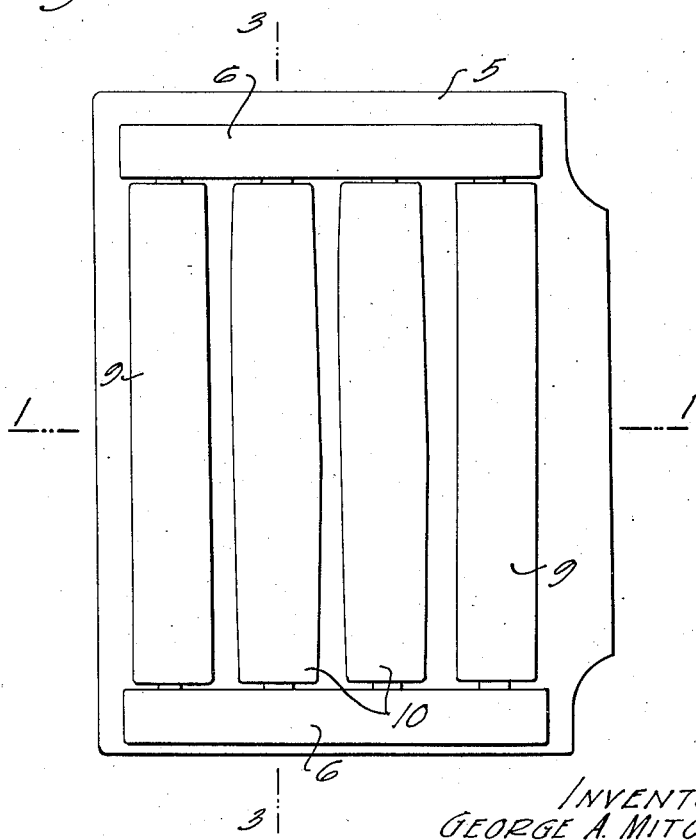
Fig. 2 is an elevation of the pressure plate and rollers viewed from the film side, with the aperture plate removed.

Referring to Figs. 1, 2, and 3, 1 denotes an aperture plate, and 2 a back plate with an opening somewhat larger than that of the aperture plate, both plates being fastened by suitable means to the casting 3 of the camera body, leaving between them a space 4 somewhat wider than the thickness of the film F. A pressure plate 5 fits with slight clearance into back plate 2. This plate is of U-shaped cross section and has two shoes 6 of polished steel with perforations 7 in one plane. Pins 8 are fixed in these perforations and journaled upon these pins are rollers 9 and 10, preferably made of ebony. End rollers 9 are of uniform diameter whereas the intermediate rollers 10 are slightly crowned, their end diameters being approximately equal to those of rollers 9 and the diameter of the middle part being larger. The difference between the two extreme diameters is very slight, for example of the approximate magnitude of 0.0015 of an inch. A yoke 16 is secured to back plate 2 with screws 19 and has a threaded insert 17 with a thumb screw 18. By means of yoke 16 and screw 18 the edge of the pressure plate 5 is pressed against the back plate 2, shoes 6 being so dimensioned that there is sufficient clearance for the film or the films to slide past the aperture. Since the film framed in the aperture is constrained along the sides or margins in a plane (between aperture plate 1, shoes 6, and rollers 9) and slightly warped by rollers 10, it assumes a slightly cupped shape as indicated in Fig. 3. While this construction is particularly useful in simultaneously exposing superposed films disposed face to face in a camera, it is also useful if only one film is fed past the aperture, in order to confine it strictly to a predetermined shape, thereby preventing uncontrollable irregular buckling.

A modification of my invention will now be described with reference especially to Figs. 4 and 5 which also show an aperture plate 21 and a back plate 22. In this arrangement the side shoes 26 have inward extensions 20 at the forward end of the aperture to support a roller 29 which is shorter than the preceding rollers 39 and 40. The intermediate rollers 40 are crowned like rollers 10 and, like rollers 9, the end rollers 29 and 39 are crowned little if any and they have a diameter less than the maximum diameter of the crowned rollers, either intermediate the maximum and minimum diameters of the crowned rollers or preferably substantially equal to the minimum diameters of the crowned rollers. The pressure plate 25 is held in position by means of a bifurcated spring 28 which is fastened to the back plate 22 with a screw 27 and presses with its two arms 41 with equal force against the two sides of pressure plate 5.

It should be understood that in both modifications the crowning of the rollers is so slight that no corresponding warpage of the focal plane is required, that the number of rollers may be changed to suit the size and shape of the aperture, that the present disclosure is for the purpose of illustration only and that this invention includes all modifications and equivalents which fall within the scope of the appended claims.

I claim:

1. A motion picture machine comprising an aperture plate, film guiding shoes on opposite sides of the aperture and straight rollers at opposite ends of the aperture for positioning the four margins of each picture area substantially in the same plane, and crowned rollers intermediate said straight rollers for bending the film in two dimensions intermediate said margins.

2. A motion picture machine according to claim 1 further characterized in that said rollers are rotatably mounted on said shoes.

3. In combination with motion picture apparatus having an aperture, means for holding the four marginal portions of a film picture area in said aperture substantially in the plane thereof, and crowned roller means for slightly bowing said area of the film in two dimensions, said roller means being behind the film to bow said area toward the aperture.

GEORGE A. MITCHELL.